Patented May 2, 1933

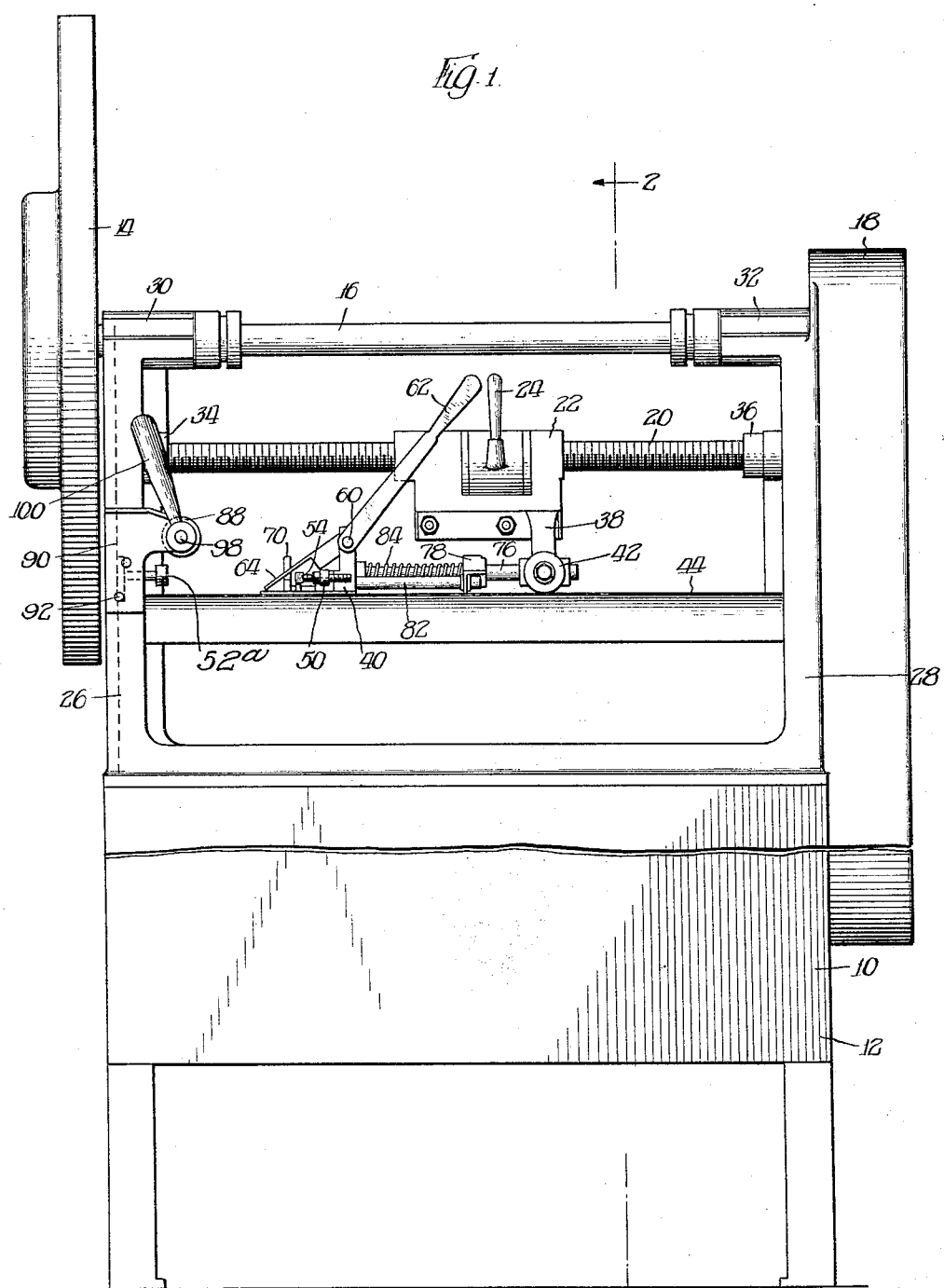

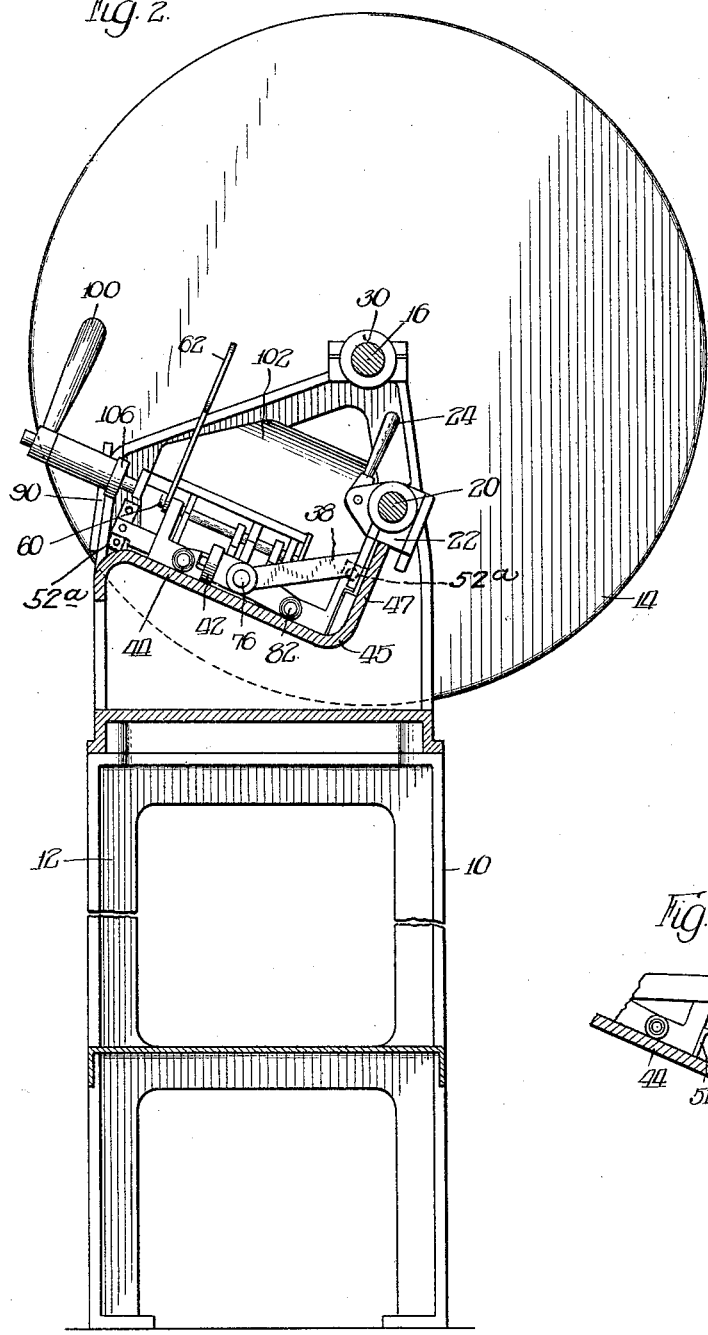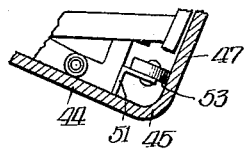

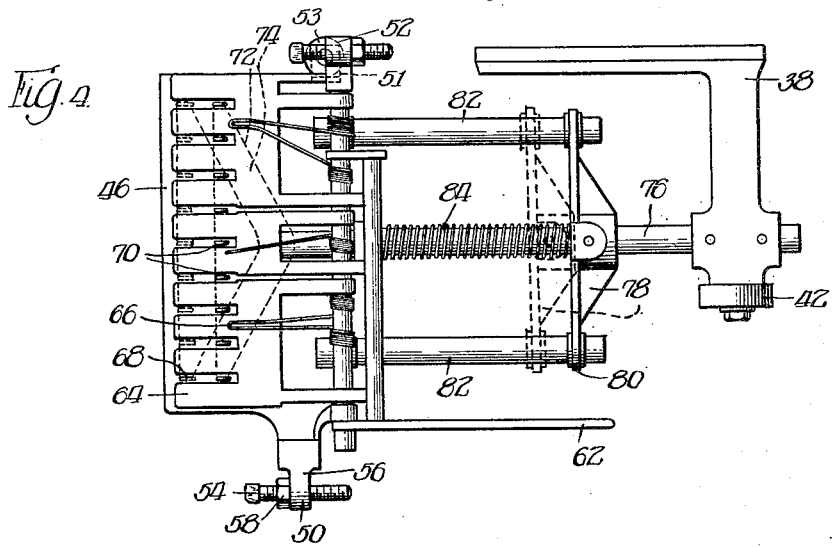
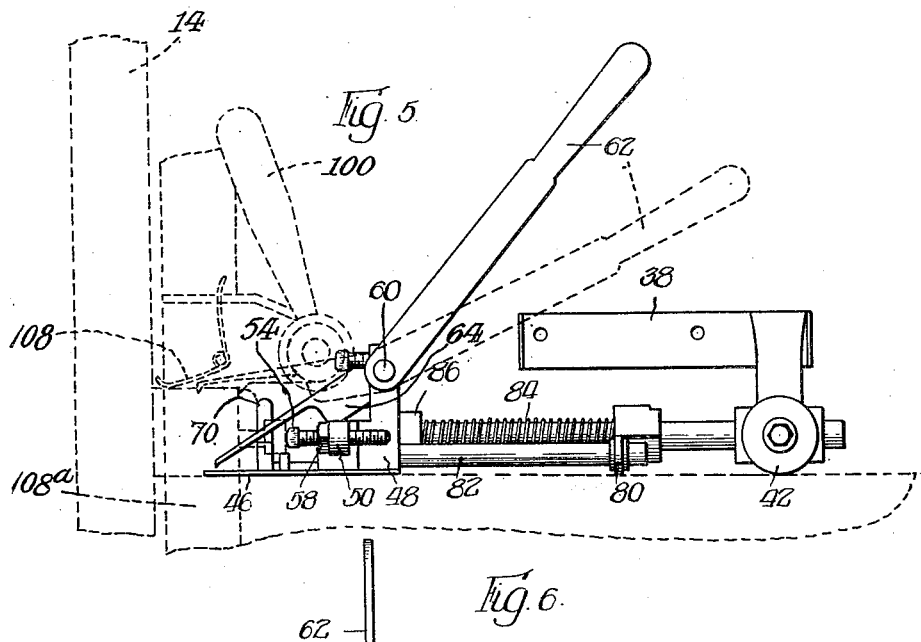
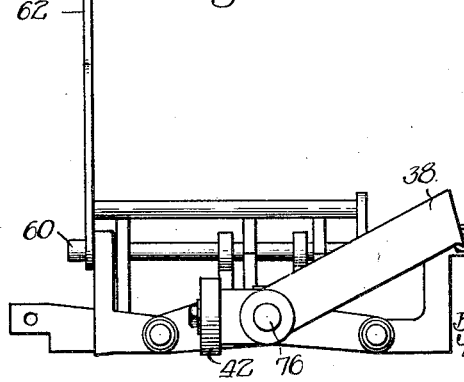

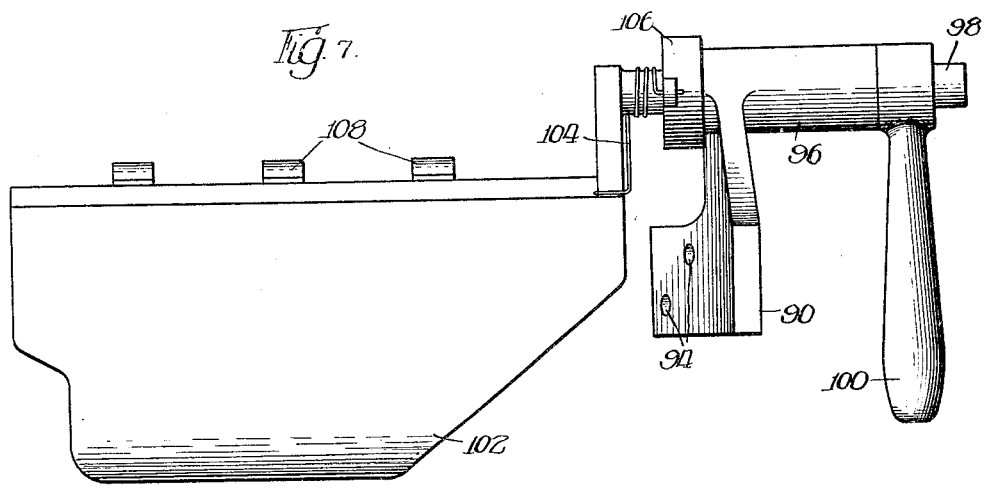
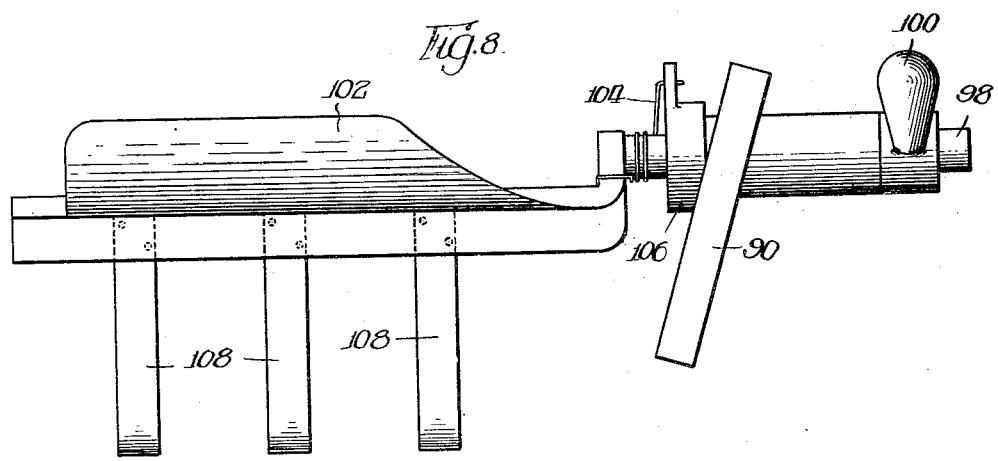
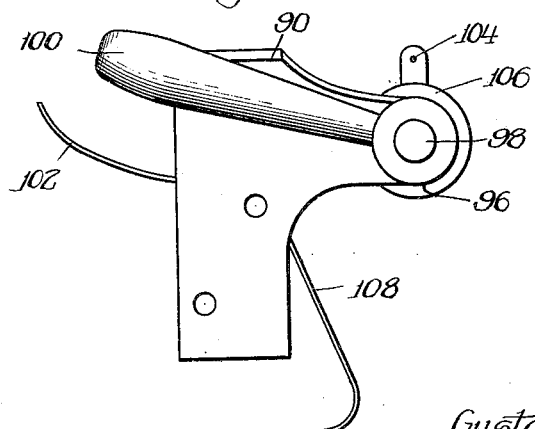

1,907,161

UNITED STATES PATENT OFFICE

GUSTAVE SCHULER, OF CHICAGO, ILLINOIS, ASSIGNOR TO SWIFT & COMPANY, OF CHICAGO, ILLINOIS, A CORPORATION OF ILLINOIS

SLICING MACHINE

Application filed July 12, 1929. Serial No. 377,698.

This invention pertains to slicing machines in which an embodiment is represented as including a guard and a material holder arranged with respect to the machine whereby a complete slicing operation of the material to be sliced may be effected.

With the usual slicing machines now on the market, a great waste occurs due to the fact that there is always a part of the material which must be secured to the machine for feeding operation to the cutting knife. These machines have no provision whereby the portion so held may be advanced to be sliced. Consequently, there are always ends of the meat or other material remaining which must either be sliced by hand, or, and which is usual, must be thrown away. It will be appreciated that, particularly in large packing plants, this waste is quite expensive and material. There is also needed an efficient knife guard associated with the cutting knife, especially in machines having progressive feed mechanism to the knife.

It is therefore an object of this invention to provide a slicing machine with a meat holder which permits complete slicing operation of the meat to be effected.

Another object of the invention is to provide a meat holding device for a slicing machine which is automatically operated to advance the entire portion of meat into cutting relation with the slicing tool.

Still another object of the invention is to provide a meat holding device which may be readily operated for holding and advancing the meat toward the cutting device.

Still another object of the invention is to provide a meat holding device for advancing the entire quantity of meat to be sliced to the slicing tool of a slicing machine which device may be readily associated with slicing machines now on the market.

A still further object of the invention is to provide a device for the cutting blade of the slicing machine which device functions as a guard and also as holding down means for the material to be sliced.

A still further object of the invention is to provide a holding device for advancing a complete quantity of material to the cutting blade of a slicing machine which device may be in cooperative relationship with a guard for the cutting tool, which guard performs the function of holding the material to be sliced in position where it may be readily sliced.

A yet further object is to provide slicing machine attachments which are inexpensive to manufacture and maintain and fulfill all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a side elevation of a meat slicing machine provided with the meat holding device and knife guard;

Figure 2 is a transverse sectional elevation of the slicing machine assembly illustrated in Figure 1, the same being taken substantially in the plane as indicated by the line 2—2 of Figure 1;

Figure 3 is a fragmentary transverse sectional elevation of a portion of the track and meat holding device;

Figure 4 is an enlarged top plan view of the meat holding device adapted to be associated with the slicing machine illustrated in Figure 1, the dotted lines showing the position of certain of the parts during operation;

Figure 5 is a side elevation of the meat holding device illustrated in Figure 4, the dotted lines showing cooperative relation with portions of the knife guard;

Figure 6 is an end elevation of the meat holding device illustrated in Figure 4, the same being shown with the roller omitted;

Figure 7 is a plan of the knife guard adapted to be associated with the cutting tool of the slicing machine illustrated in Figure 1;

Figure 8 is a plan of the knife guard illustrated in Figure 7, the same being taken substantially at 90° to Figure 7;

Figure 9 is an end elevation of the knife guard illustrated in Figure 8.

The slicing machine 10 consists essentially of a pedestal 12 and preferably an eccentric cutting knife disposed in housing 14 and carried by a shaft 16 adapted to be rotated from any source through suitable drive mechanism arranged in housing 18. The drive mechanism also drives a threaded shaft 20 at a suitable speed with respect to the shaft 16, the shaft 20 being provided with a releasable nut 22 adapted to be advanced along the shaft 20 toward the knife.

The nut 22 is provided with a handle 24 adapted to operate suitable mechanism whereby the nut 22 may be released from driving engagement with the shaft 20 so that the nut 22 may be pushed toward the right, as viewed in Figure 1, to any desired position. The nut 22 is also provided with suitable trip mechanism associated with the handle 24 whereby the nut is released from the driving engagement with the shaft 20 when it has reached a predetermined position with respect to the slicing knife.

The pedestal 12 is provided with upstanding arms 26 and 28 disposed adjacent the housing 14 and 18 and providing bearings 30 and 32 in which the shaft 16 is journalled and bearings 34 and 36 in which the shaft 20 is journalled.

The nut 22 is provided with suitable securing means for fastening a pusher arm 38 thereto, said pusher arm having cooperative engagement with the meat holder 40, the pusher arm being provided with a pusher arm roller 42 adapted to have rolling contact with a preferably inclined track or support 44 disposed between the upstanding arms 26 and 28, forming a track for the holder 40 and a support for the meat or other material to be advanced toward the knife. The holder consists essentially of a base member 46 adapted to be supported on the track 44, said base member being provided with upstanding arms or pedestals 48, said arms being provided with adjustable stops 50 and 52, which stops may include a threaded bolt 54 having threaded engagement with a thimble 56 of the pedestal and being locked in position by means of the nut 58.

The track 44 is provided with an arch portion 45 terminating in an upwardly extending bearing portion 47. This portion 47 forms a sliding bearing for a portion of the holder. This arrangement with the arch portion permits of the use of the machine for different kinds of meats. The same effect might be secured by providing a right angular portion in the track between the track portion 44 and the portion 47. This arrangement might be modified, as shown in Figure 3, by providing a bracket 51 equipped with a roller 53, pivoted to said bracket and adapted to have rolling contact with the portion 47.

The pedestals provide bearings for a shaft 60 journalled therein, said shaft having an operating handle 62 non-rotatively secured thereto, said shaft also having clamp jaw members 64 non-rotatively secured thereto. Resilient members, such as springs 66, are associated with the clamp jaw 64 and the shaft 60, normally tending to force the clamp jaws downwardly toward the base member 46.

The jaw members 64 are provided with spaced slots 68 of sufficient depth to accommodate upstanding pusher bar combs or fingers 70 normally disposed in that portion of the slot removed from the forward edge of the clamp jaws. The pusher bar combs 70 are secured to the pusher bar 72 movably carried by the base 46 and said combs are for engagement with an appreciable part of the material to be sliced, whereby it may readily be advanced by operation of the pusher bar. Said pusher bar includes a plate member 74 secured to a shaft 76 adjustably secured to the pusher arm 38. The rod 76 is provided with a cross head or yoke 78 adjustably secured thereto and provided with bearings 80 having sliding engagement with guides 82 secured to the base member 46, or as shown, to the base member 46 through the pedestals 48.

A spring 84 is disposed between the cross head 78 and a stop 86 carried by the base and arranged so that the spring normally maintains the combs in the rear of the slots 68. In other words, the spring is sufficiently strong for permitting movement of the holder 40 toward the cutting knife without movement of the pusher bar.

A safety guard and holder 88 is provided on the arm 26 and arranged for holding engagement with the meat to be sliced and to guard the operator from the slicing knife. The guard 88 is secured thereto as by a bracket 90 through any suitable fastening means such as the rivets 92 disposed in apertures 94, the bracket being provided with bearing 96 in which a shaft 98 is journalled. The outer end of the shaft is provided with an operating handle 100 and the inner end of the shaft is provided with a plate guard member 102 preferably curved or shaped to clear the cutting knife, said guard member being normally urged into guarding position with respect to the knife by means of the spring 104 arranged between the guard 102 and a spring tension collar 106 associated with the bearing 96. The guard is suitably spaced from the knife and is provided with holding down means or arms 108 so disposed as to have engagement with the material 108a to be sliced (see Figure 5) to urge the same toward the track 44 along which the material is advanced, whereby a clean cut may be effected no matter of what size the material may be so long as there is any engagement between the arms 108 and said material.

In operation, the material 108a to be cut, such as for example, a belly, is secured between the jaws 64 and the base 46, projecting toward the knife and resting upon the track 44. The securing of the belly is made after operation of the nut mechanism to inoperative position, as for example, after release of the nut 22 through the handle 24, and movement of the nut toward the right, as viewed in Figure 1, to provide clearance between the holder and the knife for insertion of the belly.

The jaws 64 are then raised by a movement of the handle 62 in a clockwise direction, as viewed in Figure 1, whereupon the belly may be inserted and the handle 62 released to permit the spring 66 to depress the jaws 64 into clamping relation with respect to said belly.

The handle 100 of the safety guard may be rotated against the spring 104 to raise the fingers 108 permitting the belly to be advanced toward the knife. The handle 100 may then be released and the fingers 108 will be forced by the spring 104 into holding relation with the belly, it being seen that the fingers 108 are provided with an arcuate end for permitting ready advance of the material along the track 44. The handle 24 may then be actuated to effect operating relation by engagement of the nut mechanism with the threaded shaft 20 for advancing the nut 22 and consequently the holder mechanism 40 toward the left, as viewed in Figure 1, whereupon the material is advanced for slicing into the eccentric knife, the sliced material falling downwardly into a proper receptacle, not shown. The holder 40 is advanced until the stops 50 and 52 come into contact with suitable stops 52a provided on the machine whereupon the base 46 advances no further toward the cutting blade. However, the nut 22 will continue to advance as it has not been released from the shaft 20. This causes the pusher arm 38 to move toward the blade, advancing the shaft 76 on the cross head 78, compressing the spring 84 against the stop 86. Movement of the shaft 76 causes the pusher bar 72 to be moved and consequently the combs 70, which causes movement of the material to be sliced toward the cutting blade, forcing it outwardly from between the jaws 64 (see Figures 4 and 5). The guard arms 108 may be in substantial contact with the jaws 64 and also the material to be sliced whereby a clean and effective cut may be made even of the thin belly so that the arms 108 form means in addition to the springs 66 for preventing abrupt release of the belly and in effect form a continuation of the jaws of the holder for effecting a clean cut of the thin material.

The combs and pusher bar continue to advance until suitable mechanism is operated to release the nut 22 from the shaft 20 whereupon the spring 84 will return the pusher bar and combs to their normal position where the combs 70 are in the rear of the slots 68.

The nut is not released until after all of the material is sliced, and the nut once released, the handle 24 may be grasped to move the pusher arm and holder mechanism toward the right, as viewed in Figure 1, where another belly may be inserted and operations as have already been described repeated. In this manner a very effective and economical machine is provided for completely slicing a belly, eliminating the waste attendant of this operation, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a meat holder for a slicing machine the combination of a base member having stops and upstanding pedestals, jaw members pivoted to and between said pedestals and having resilient members urging said jaw members toward said base member into clamping relation therewith, a handle for moving said jaw members, a pusher member having upstanding combs thereon, said jaw members having slots therein disposed at intervals for accommodating said combs, track members and a stop carried by said base member, a yoke slidably carried by said track members and secured to said pusher member for moving said pusher member, means for moving said yoke and resilient means disposed between said yoke and last named stop for urging said yoke away from said base member.

2. In a meat holder for a slicing machine the combination of a base member having stops and upstanding pedestals, jaw members pivoted to and between said pedestals and having resilient members urging said jaw members toward said base member into clamping relation therewith, a handle for moving said jaw members, a pusher member associated with said base member, track members and a stop carried by said base member, a yoke slidably carried by said track members and secured to said pusher member for moving said pusher member, means for moving said yoke, and resilient means disposed between said yoke and last named stop for urging said yoke away from said base member.

3. In a slicing machine, the combination of a base for supporting material to be sliced, a knife disposed adjacent said base, means for holding and advancing material along said base, to said knife, a guard for said knife, which guard is mounted so as to swing as a whole about a transversely extending axis, and a member for angularly positioning said guard, said guard having spring members providing material engaging members for holding said material against said base.

4. In a slicing machine the combination of a base for supporting material to be sliced, a knife disposed adjacent said base, a holder for advancing material along said base, said holder having means for completely advancing said material to said knife, a guard for said knife, which guard is mounted so as to swing as a single member about a transversely extending axis, and a handle providing an operating member for imparting angular movement to said guard, said guard having springs thereupon providing material engaging members for holding said material against said base, said members engaging said holder for preventing abrupt release of said material by said means.

5. In a slicing machine the combination of a base for supporting material to be sliced, a knife disposed adjacent said base, means for holding and advancing material along said base to said knife, means on said machine for advancing said first named means, and a guard for said knife, said guard comprising a pivotally mounted member angularly movable about a transversely extending axis and having thereupon transversely spaced springs providing longitudinally extending material engaging members for holding said material against said base as the material is longitudinally fed along said base, which said springs yieldably engage said means for preventing abrupt release of said material.

6. In a slicing machine the combination of a base for supporting material to be sliced, a knife disposed adjacent said base, a holder for advancing material along said base, said holder having means operable for completely advancing said material to said knife after said holder has been rendered inoperative, a guard for said knife, said guard having material engaging members for holding said material against said base, said members engaging said holder for preventing abrupt release of said material by said means.

7. In a slicing machine the combination of a base for supporting material to be sliced, a knife disposed adjacent said base, means for holding and advancing material along said base to said knife, a guard for said knife said guard including a pivoted member normally permitting access of only the material to said knife, said member having depending material engaging fingers for holding said material against said base.

8. In a slicing machine the combination of a base for supporting material to be sliced, a knife disposed adjacent said base, means for holding and advancing material along said base to said knife, a guard for said knife, said guard including a pivoted member normally permitting access of only the material to said knife, said member having depending material engaging fingers for holding said material against said base, said fingers having an arcuate material engaging portion permitting relative sliding movement between said material and fingers.

9. In a slicing machine the combination of a base for supporting material to be sliced, a knife disposed adjacent said base, means for holding and advancing material along said base to said knife, a guard for said knife, said guard including a pivoted member normally permitting access of only the material to said knife, said member having depending material engaging fingers for holding said material against said base, said fingers having an arcuate material engaging portion permitting relative sliding movement between said material and fingers and means for moving said guard to inoperative position.

10. In a slicing machine the combination of a base for supporting material to be sliced, a knife disposed adjacent said base, means for holding and advancing material along said base to said knife, a guard for said knife, said guard including a pivoted member normally permitting access of only the material to said knife, said member having depending material engaging fingers for holding said material against said base, said fingers having an arcuate material engaging portion permitting relative sliding movement between said material and fingers, means for moving said guard to inoperative position, and resilient means for returning said guard to operative material engaging position.

11. In a slicing machine the combination of a base for supporting material to be sliced, a knife disposed adjacent said base, means for holding and advancing material along said base to said knife, a pivotally mounted guard for said knife, said pivotally mounted guard having thereupon transversely spaced individual spring pressed material engaging members for holding said material against said base as said material is fed longitudinally to said knife, means for angularly moving said guard to inoperative position, and resilient means for returning said guard to operative material engaging position.

12. In a slicing machine the combination of a base for supporting material to be sliced, a knife disposed adjacent said base, a holder for advancing material along said base, said holder having means for completely advancing said material to said knife, a guard for said knife and angularly movable about a transversely extending axis to and from guarding position, said guard having thereupon transversely spaced springs with yieldable end portions that provide material engaging members for holding said material against said base when the material is being longitudinally advanced along said base, said members engaging said holder for preventing abrupt release of said material by said means, means for moving said guard from guarding position, and resilient means for returning said guard to guarding position.

13. In a slicing machine the combination of a base for supporting material to be sliced, a knife disposed adjacent said base, a holder for advancing material along said base, said holder having means operable for completely advancing said material to said knife after said holder has been rendered inoperative, a guard for said knife, said guard having material engaging members for holding said material against said base, said members engaging said holder for preventing abrupt release of said material by said means, means for moving said guard to inoperative position, and resilient means for returning said guard to operative material engaging position.

14. In a slicing machine the combination of a base for supporting material to be sliced, a knife disposed adjacent said base, means for holding and advancing material along said base to said knife, a guard for said knife said guard including a pivoted member normally permitting access of only the material to said knife, said member being shaped to clear the knife upon movement thereof to inoperative position and having depending material engaging fingers for holding said material against said base.

15. In a slicing machine the combination of a base for supporting material to be sliced, a knife disposed adjacent said base, means for holding and advancing material along said base to said knife, a guard for said knife said guard including a pivoted member normally permitting access of only the material to said knife, said member being shaped to clear the knife upon movement thereof to inoperative position and having depending material engaging fingers for holding said material against said base, means for moving said guard to inoperative position and resilient means for returning said guard to operative material engaging position.

16. In a holder for a slicing machine the combination of releasable clamping members for accommodating the material to be sliced, normally inoperative pusher means carried by said holder, and means for moving said pusher means for moving the material free of said clamping members.

17. In a holder for a slicing machine, the combination of releasable clamping members for accommodating the material to be sliced, normally inoperative pusher means carried by said holder, and means for moving said pusher means for moving the material free of said clamping members, and means for returning said pusher means to inoperative position.

18. In a holder for a slicing machine the combination of releasable clamping members for accommodating the material to be sliced, a normally inoperative pusher member carried by said holder, members secured to said pusher member for advancing said holder, said members moving said pusher member for moving the material free of said clamping members after movement of said holder is arrested.

19. In a holder for a slicing machine the combination of releasable clamping members for accommodating the material to be sliced, a normally inoperative pusher member carried by said holder, members secured to said pusher member for advancing said holder, said members moving said pusher member for moving the material free of said clamping members after movement of said holder is arrested and means for normally maintaining said pusher member in inoperative position with respect to said clamping members, said means acting to return said pusher member to inoperative position after relative movement between said holder and pusher member.

20. In a slicing machine the combination of a base for supporting material to be sliced, a knife disposed adjacent said base, a holder for advancing material along said base, said holder having means operable for completely advancing said material to said knife after said holder has been rendered inoperative, a guard for said knife, said guard having material engaging members for holding said material against said base, said members engaging said holder for preventing abrupt release of said material by said means, means for urging said guard toward said holder, and means for moving said guard away from said holder.

21. In a slicing machine, the combination of a base for supporting material to be sliced, a knife disposed adjacent said base, means for holding and advancing material along said base to said knife, a guard for said knife, said guard including a pivoted member normally permitting access of only the material to said knife, said member having depending material engaging fingers for holding said material against said base, said fingers having an arcuate material engaging portion permitting relative sliding movement between said material and fingers, means for urging said guard toward said base, and means for moving said guard away from the material.

22. In a holder for a slicing machine the combination of releasable clamping members for accommodating the material to be sliced, means for moving said clamping members to selected position, normally inoperative pusher means carried by said holder, and means for moving said pusher means for moving the material with respect to said clamping members.

23. In a holder for a slicing machine the combination of releasable clamping members for accommodating the material to be sliced, means for moving said clamping members to selected positions, a normally inoperative pusher member carried by said holder, members secured to said pusher member for advancing said holder, said members being adapted to move said pusher member for moving the material with respect to said clamping members, and means for normally maintaining said pusher member in inoperative position with respect to said clamping members.

24. In a holder for a slicing machine the combination of releasable clamping members for accommodating the material to be sliced, means for moving said clamping members to selected positions, a normally inoperative pusher member carried by said holder, members secured to said pusher member for advancing said holder, said members being adapted to move said pusher member for moving the material with respect to said clamping members, and means for normally maintaining said pusher member in inoperative position with respect to said clamping members, said means being adapted to return said pusher member to inoperative position after relative movement between said holder and pusher member.

25. In a holder for a slicing machine, the combination of a releasable clamping member for accommodating the material to be sliced, and means carried by said holder for moving said material to be sliced with respect to said clamping member.

26. In a holder for a slicing machine, the combination of a releasable clamping member for accommodating the material to be sliced, means for moving said clamping member to selected positions, pusher means carried by said holder, and means for moving said pusher means for moving said material to be sliced with respect to said clamping member.

Signed at Chicago, Illinois, this 22nd day of June, 1929.

GUSTAVE SCHULER.